Aug. 21, 1934.  R. J. ANDERSON  1,971,091
BREAD TOASTING MACHINE
Filed April 28, 1930   6 Sheets-Sheet 2
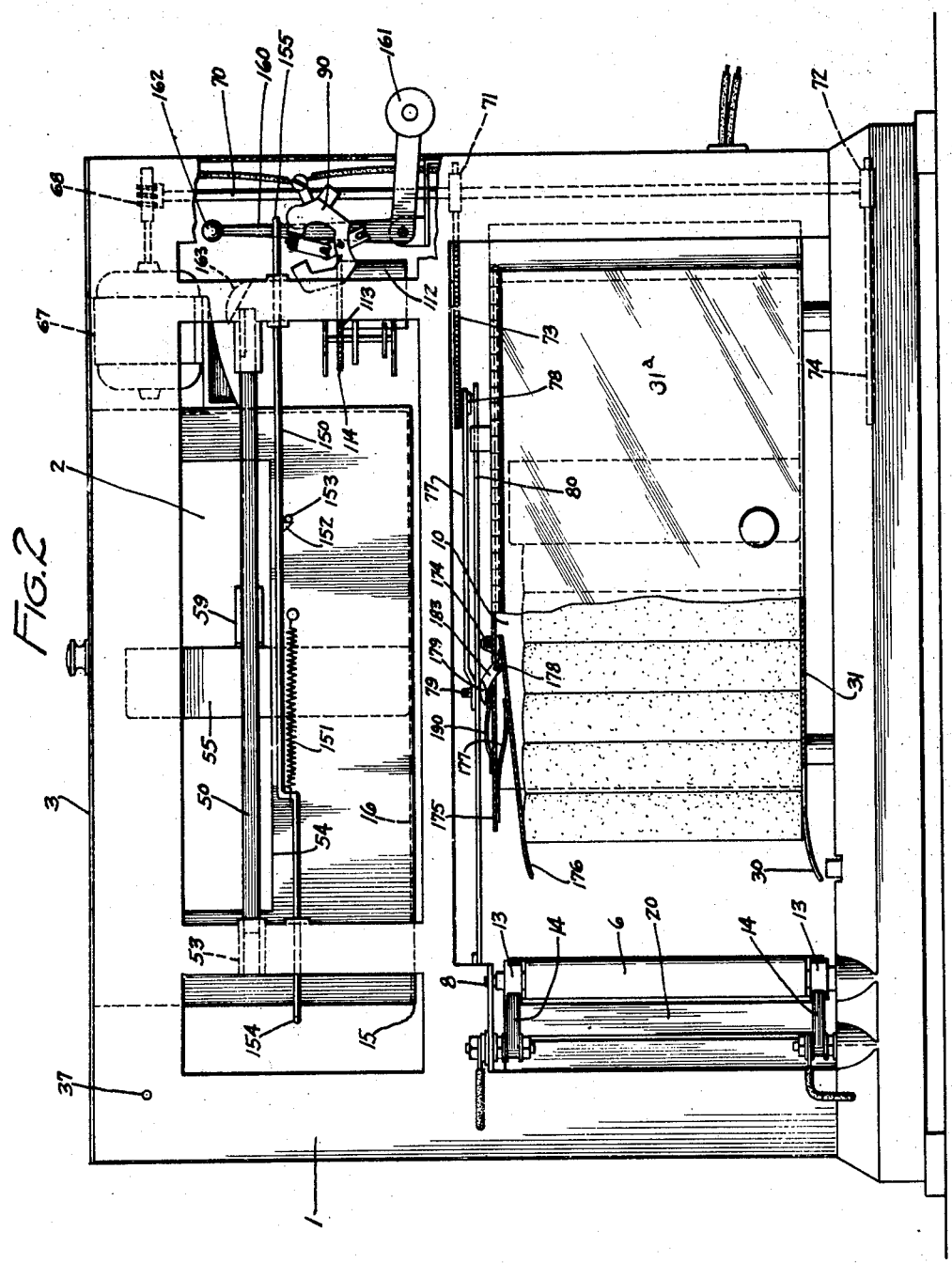
Inventor
ROY J. ANDERSON
By Noud, Paul Moore
ATTORNEYS

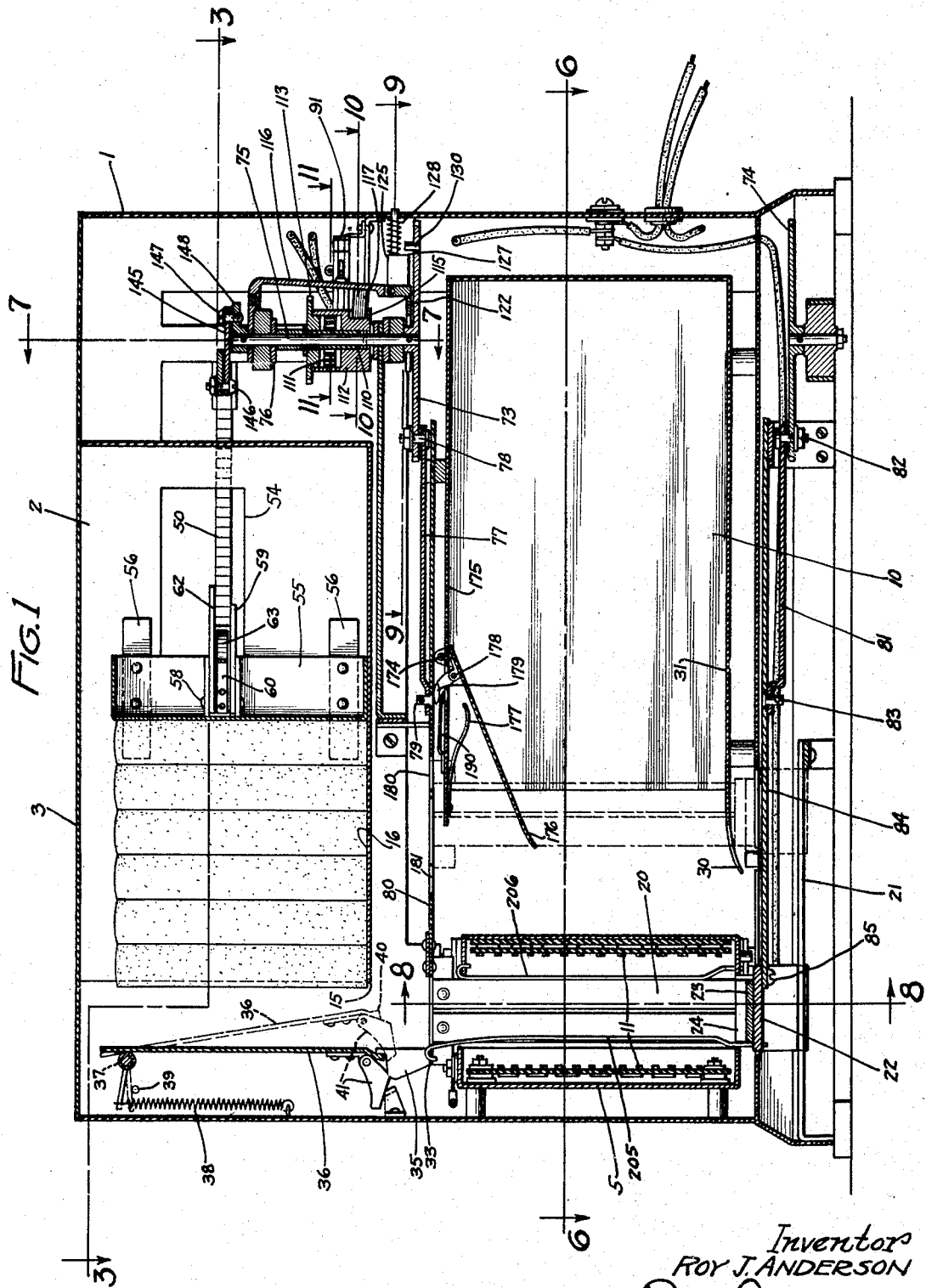

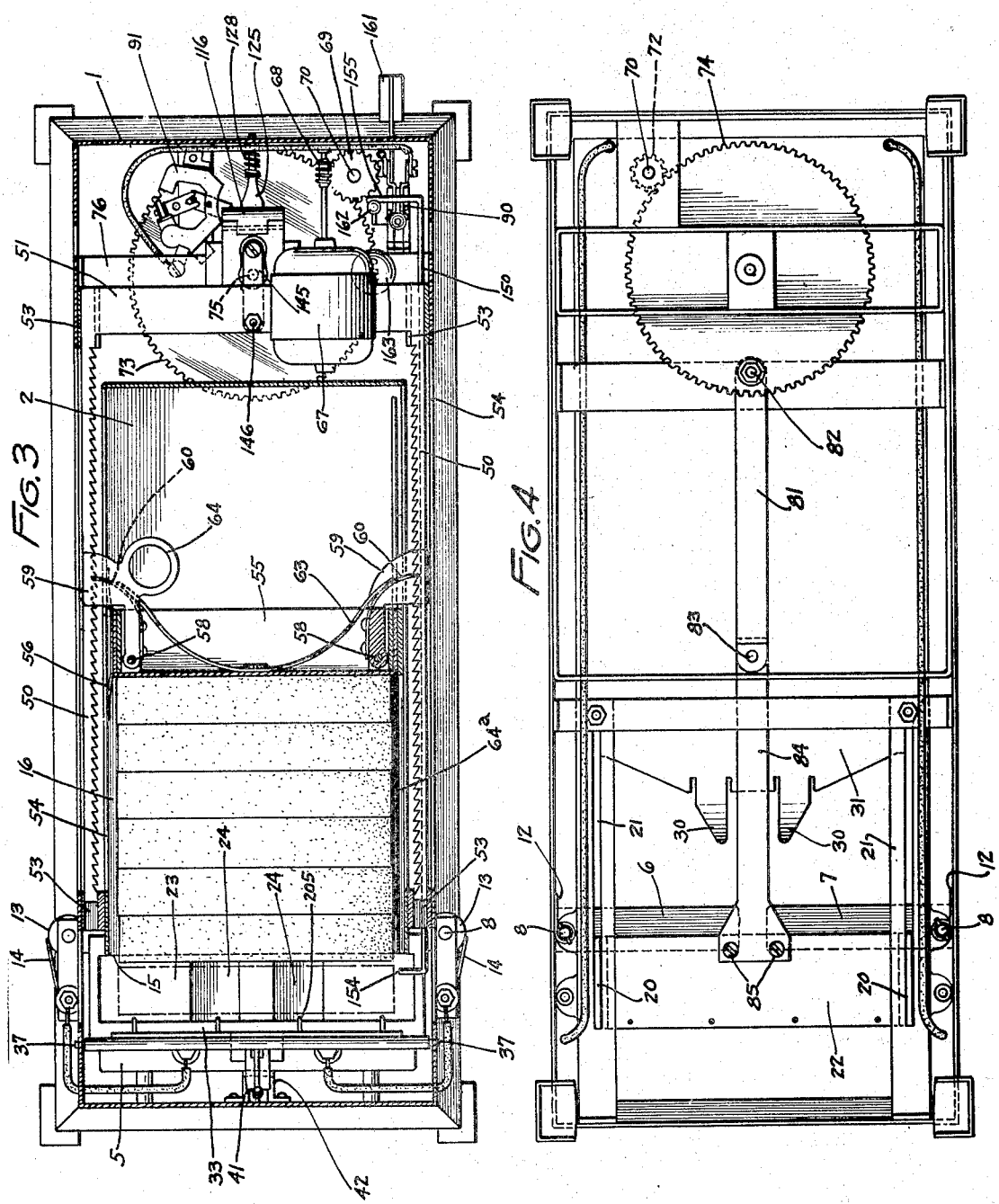

Aug. 21, 1934.  R. J. ANDERSON  1,971,091
BREAD TOASTING MACHINE
Filed April 28, 1930   6 Sheets-Sheet 4
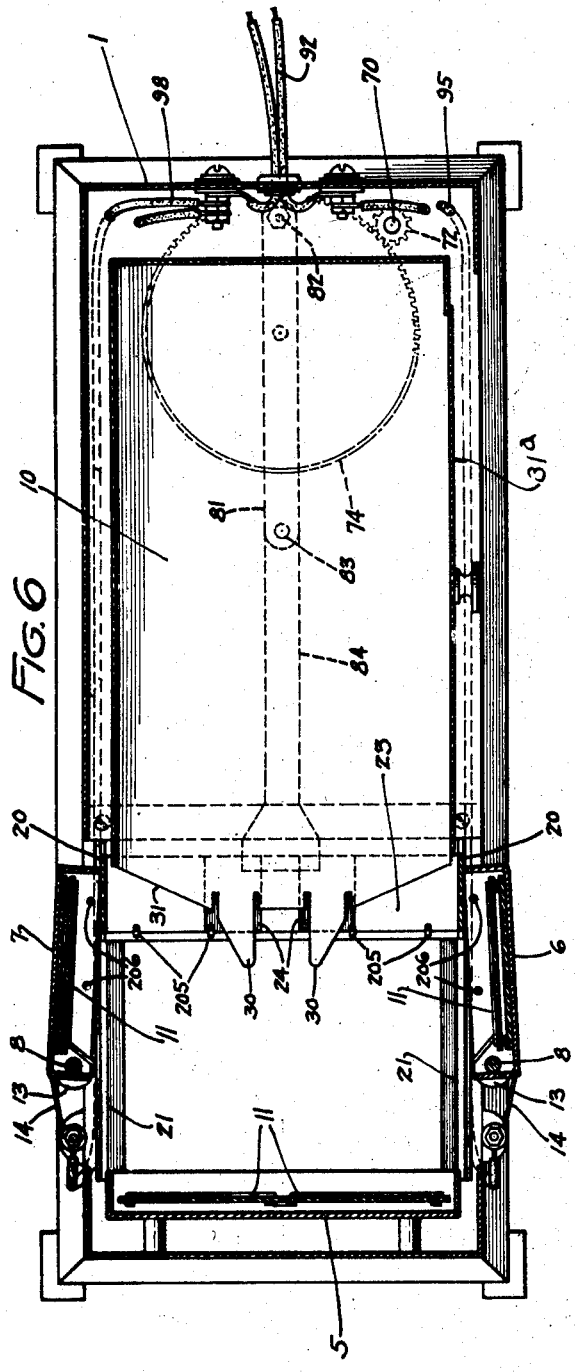
Inventor
Roy J. Anderson
ATTORNEYS

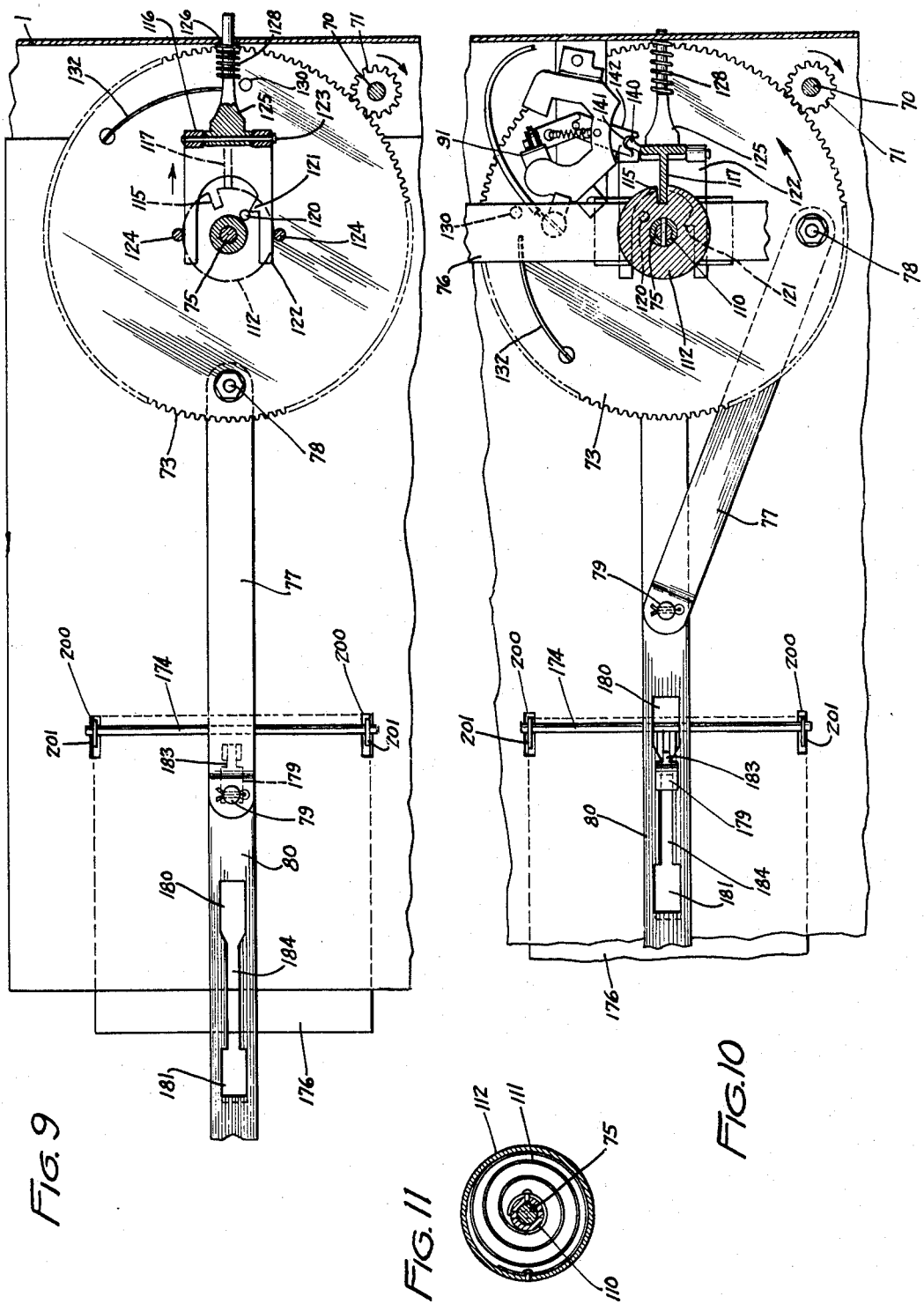

Patented Aug. 21, 1934

1,971,091

UNITED STATES PATENT OFFICE 1,971,091

BREAD TOASTING MACHINE

Roy J. Anderson, Chicago, Ill., assignor, by mesne assignments, to Waters-Genter Company, Minneapolis, Minn., a corporation of Minnesota Application April 28, 1930, Serial No. 447,980

27 Claims. (Cl. 53—5)

This invention relates to improvements in cooking and bread toasting apparatuses, and has among its objects to provide a device adapted to handle a plurality of articles such as slices of toast, and to feed said articles one by one to a cooking chamber, cook each article, and then eject the cooked article, all the operations being automatically performed. Another object is to provide means whereby after the supply of articles has been exhausted (cooked), to automatically stop the machine and produce an audible or visual signal indicative of such condition. Another object is to provide a heated storage chamber for the cooked article to which chamber the article is delivered directly from the cooking chamber. Another object is to provide means whereby the heating chamber is opened to permit ejection of the cooked article, and wherein at this time heat is delivered, from the heating to the storage chamber.

The device primarily includes a supply compartment, a heating compartment into which the article to be cooked is delivered from the supply compartment, a storage compartment into which the cooked article is delivered from the cooking compartment, along with means for transferring the contents of the supply compartment to the cooking compartment, means for moving the article from the cooking compartment to the storage compartment, and means for synchronizing these operations, and for causing the food to remain in the cooking or heating compartment for a predetermined period of time, which may be varied.

Another important feature of the invention which is broadly claimed is the production of a really automatic device, that is one in which the machine can be initially supplied with a large number of articles to be cooked and in which these articles can be fed one by one into a cooking chamber, then cooked, and then ejected from the cooking chamber either to a point outside the machine or preferably to a heated storage compartment, and in which, after initial charging of the magazine and setting the mechanism in operation, the whole performance is automatic until the supply of uncooked articles is exhausted.

The invention is particularly valuable where large quantity production is required.

All details of construction are claimed, along with the broader features of the invention.

Features and advantages of the invention will also be pointed out in the description of the drawings forming a part of this application, and in said drawings:

Figure 1 is a vertical longitudinal section showing the parts positioned as when the main switch is closed, but at which it is about to be opened after winding of the clock spring, to permit a timing operation;

Figure 2 is a side elevation partly in section, with the parts positioned in correspondence to Figure 1;

Figure 3 is a plan section substantially on line 3—3 of Figure 1;

Figure 4 is a bottom plan view of the parts positioned in correspondence to Figures 1, 2 and 3;

Figure 5 is a detail section on a section line corresponding to that of Figure 1, showing the bread release or tension plate conditioned for release;

Figure 6 is a plan section substantially on line 6—6 of Figure 1, but with the ejector shown at its ejecting limit, and showing the storage chamber in communication with the heating chamber;

Figure 9 is a plan section on line 9—9 of Figure 1 showing in dotted lines the timer trip plate, positioned as during a timing operation, and with the motor switch open;

Figure 10 is a section on line 10—10 of Figure 1 showing the trip plate untripped, as during a clock spring winding operation, and with the motor switch closed;

Figure 11 is a section on line 11—11 of Figure 1 showing the relation of the clock winding spring to the winding shaft and spring barrel; and Figure 12 is a diagram illustrating the electrical circuits.

Figure 8:
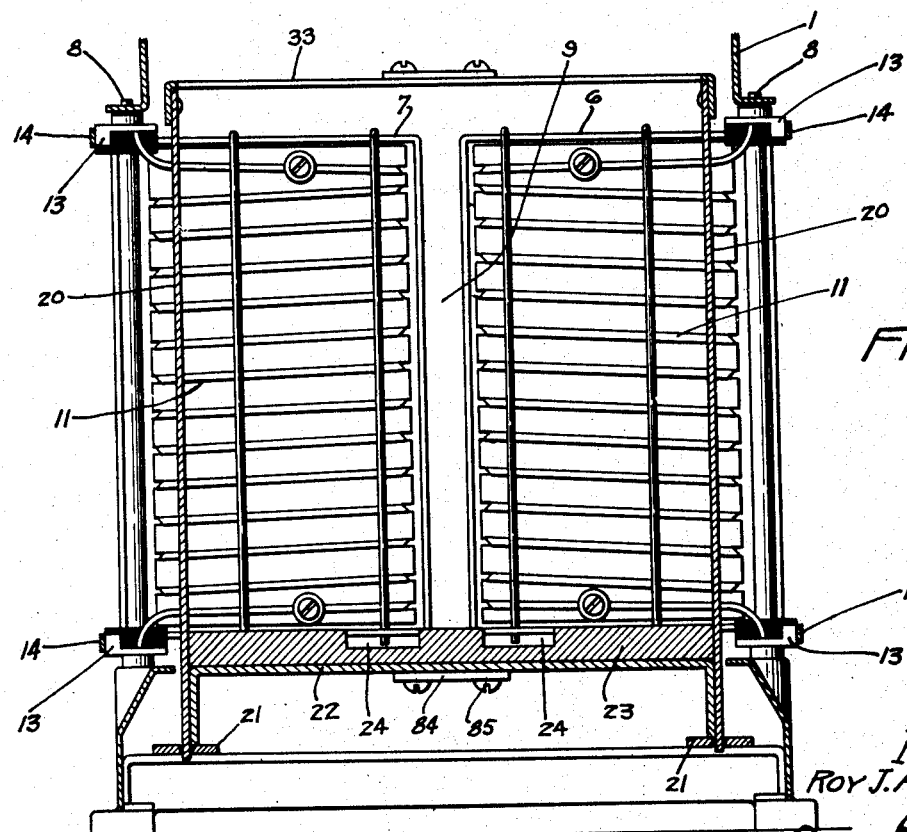
Figure 8 is a vertical section on line 8—8 of Figure 1 illustrating the ejector and heating chamber.

Although the invention herein is described as applied to making toast, it will be understood that it can be used for preparing other kinds of food. The device includes a supporting and enclosing structure, generally designated 1 and providing a magazine 2 closable by a door 3 at the top. At a point below the magazine and, in this instance, at one end of the device heating element supports, three in number, are vertically arranged to partly form a heating (toasting) chamber. One of these elements 5 is stationary, while the other two respectively designated 6—7 are mounted as doors extending transversely to the line of feed and suitably pivoted as at 8. In the structure as shown, they do not extend entirely across the device. One swinging heater support only may be employed. These movable elements 6—7 form one side of the toasting chamber. A space 9 (see Figure 8) is left between their free ends to provide communication between the toast storage chamber 10 (into which the toast is delivered from the toasting chamber) and said heating chamber. A heating means 11 is mounted on each of the elements 5, 6, 7. The pivots 8 of the doors are arranged in suitable brackets and springs 12 (see Figure 4) are provided which normally urge the doors to the closed, or heating-chamber-forming position. The electrical connections are made by means of armatures 13 engaged by brushes 14. All parts are suitably insulated, although the insulation has not been shown. The forward edge 15 of the bottom 16 of the bread magazine 2 is arranged so that a slice of bread can fall by gravity into the toasting chamber in a direction parallel with its face of greatest area. The doors (or equivalent movable heating-chamber-forming elements) as heater-carrying elements, and the stationary heater-carrying elements are spaced to provide two sides of the toasting chamber to be opposed to the corresponding faces of greatest area of the received slice of bread. The other sides of the chamber are formed by an upstanding rectangular frame called the ejector, which includes side elements 20, see Figure 8. This frame is supported for horizontal motion on suitable guides 21 spaced transversely and extending in direction of feed. The lower ends of the elements 20 are guided in elements 21. These side frames 20 are connected by a bottom member 22. On the top of this piece 22 is mounted a block 23 which has grooves at 24 extending in a direction of feed. The lower edge of the bread or article to be cooked, rests upon this block. The grooves 24 and fingers 30 (see Figures 1 and 4) of the bottom 31 of the toast storage chamber cooperate to transfer the article to the upper surface of the bottom of the magazine. The upper ends of the side elements are connected by a cross piece 33 and on this cross piece is mounted a trip 35 (see Figures 1 and 5) which is adapted to engage a swingable element 36 which will be referred to herein as the tension plate. The function of this plate is first to act as a tensioned abutment (against which the endmost slice of bread is forced by the feed mechanism) to prevent premature delivery into the cooking chamber, second to release the slice at the proper time to deliver it into the toasting chamber.

The tension plate 36, is pivoted at its top as at 37 shown and is provided with a spring 38 which normally holds it against a stop 39 in angular position shown in dotted lines in Figure 1, at which position its lower end 40 is so positioned as to prevent delivery of a slice of bread into the toast chamber. On the forward feed of the bread, the forward face of the bread engages the face of the plate and continued feed motion of the bread pushes the plate eventually to the position shown in Figure 5, at which point its further motion is prevented by the engagement of the pivoted detent 41 with the stop 42. The detent is tripped by the element 35 mounted upon the ejector, or by that element which operates the doors of the toasting chamber. The tripping takes place substantially as the doors are closed, and therefore when the toasting chamber is complete and ready for the reception of the toast. The movement of the frame is comparatively rapid so that the kick-off action of the trip 35 is sufficiently rapid to have caused the trip to assume the position shown in Figure 1, before the bread moves toward the toasting chamber. Thus no obstruction will at that time be in its path of motion. This stop and kick-off means is provided so that the toast may be held until the toasting chamber is conditioned (by closing of the doors) to receive it. Figure 5 shows the bread just about to be released. The bread passes into the toasting chamber through opening 43 formed in the plate 33 upon which the trip 35 is mounted.

Feeding mechanism

The mechanism for feeding the toast (see Figures 1 and 3) includes two ratchet bars 50 cross-connected at one end by element 51 to form a U-shaped frame, suitably guided as at 53. The bars are arranged at the outside of the magazine casing. Slot-like openings 54 are formed in the vertical walls of the casing. The follower 55 is slidably arranged within the magazine casing and is provided, at least on one side, with horizontally extending resilient elements 56 acting to assist in yieldably, yet slidably, supporting it in upright position. The bottom of the follower slides upon the bottom of the magazine casing, and its opposite side engages the opposite vertical face of the casing as shown in Figure 3. Pivoted to the rear of the follower, as at 58, for horizontal motion, are pawl mounts 59 and each has attached thereto a spring finger 60, as a pawl, which is adapted to engage with the corresponding ratchet, as best shown in Figure 3. The pawl mounts have guide grooves 62 which engage or are received by the ratchet rods to maintain an upright position of the follower. These guides 59, as well as the fingers 60, are yieldably urged to operative position by means of a spring 63 best shown in Figure 3, connected at a midpoint and having its terminals engaging the spring fingers as shown. Each pawl mount is provided with an opening 64 into which the finger can be inserted to swing the mounts towards one another to release the pawls when it is desired to move the follower to initial position, as when filling the magazine.

A guide strip 64ᵃ also projects upwardly from the upper surface of the bottom of the magazine. The slices engage this guide strip and are thus prevented from moving toward that side adjacent which the strip is provided. This is for the purpose of preventing the bread from actuating the switch throwing rod adapted to be moved by the follower after the magazine is empty, to automatically stop the operation of the machine. It will be seen that the bread release or tension plate 36 assumes three positions. In the first position, shown in dotted lines in Figure 1, it acts as a tensioned abutment to substantially prevent forward tipping of the slice, and prevent premature delivery into the heating chamber; in the second it acts to hold the bread against further forward motion, and in position to be dropped; and in the third to release the bread for delivery into the cooking chamber. Two points should be noted. The first is that the forward slice must be moved so that its rear edge shall clear the forward edge of the bottom of the magazine, and the second is that at the time of release, the surfaces of the forward and following slices must not be under compression contact.

Jam-preventing means

To prevent such jamming of the bread as would cause the second slice to engage the forward slice and prevent its free falling motion, a slip-back of the follower 55 is provided. For example, if the bread should become compressed between the plate 36 when at the position shown in Figure 5, and the face of the follower 55, the follower would slip rearwardly when the racks move rearwardly or are retracted, and thus compression would be released. Since this retraction of the racks takes place before the tension plate is tripped or moved to the position shown in Figure 1, it is evident that this tension, if present, is always relieved before the release of the forward slice. This provision of the release of bread tension, is an important feature. It will, of course, be understood that the slices should have uniform thickness, and a bread slicing machine is generally used in conjunction with the present device.

Driving and synchronizing mechanism

Figure 7:
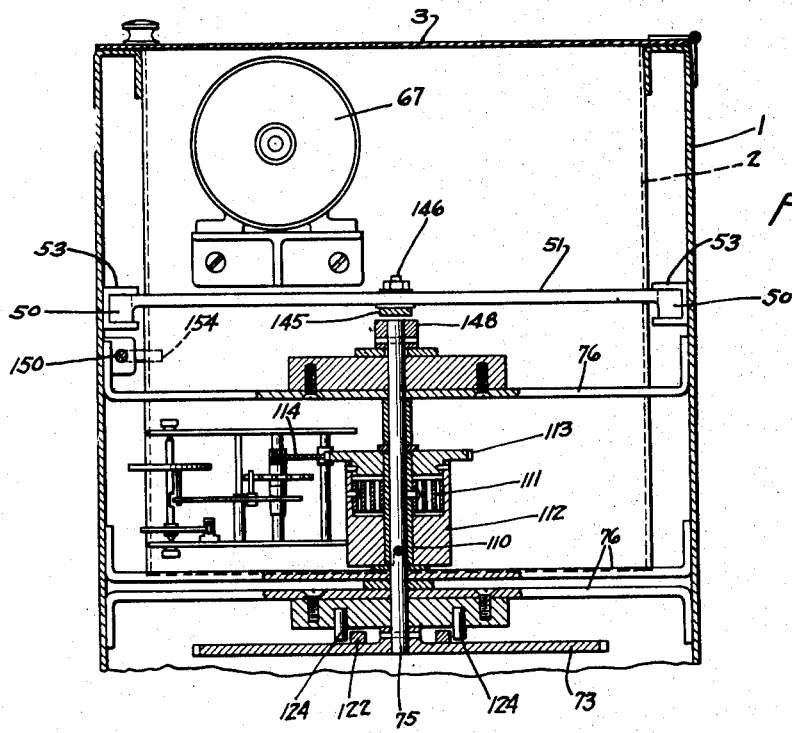
Figure 7 is a vertical section on line 7—7 of Figure 1 illustrating the timer mechanism.

The driving mechanism includes a motor 67 suitably mounted, as best shown in Figures 2, 3 and 7, and this motor is provided with the usual shaft having a worm pinion 68 operating with a worm gear 69 secured at the top of a vertically arranged main operating shaft 70 held in suitable bearings. This shaft is provided with two pinions respectively designated 71—72, the vertical positions of which are shown in Figure 2. Each pinion meshes with a corresponding larger gear 73—74. The uppermost gear 73 is mounted upon a shaft 75, and is arranged between the top of the storage chamber and the bottom of the magazine, and its shaft has its bearings in cross frames 76 as best shown in Figure 7. The bottom gear 74 is rotatably arranged in the base below the storage chamber. These two larger gears are identical in size, as are the pinions 71—72 and they move in unison when the motor is operating. The axes of the gears 73—74 are aligned vertically.

These gears may be considered as crank gears. The upper gear 73 has a crank arm or link 77 pivoted by one end thereto as at 78. This arm is pivoted by its opposite end as at 79 to an ejector operating link 80. This link is slidably guided for movement in direction of feed and has its forward end attached to the upper cross piece 33 of the ejector and toasting chamber door-operating frame, previously described. This rod is slotted longitudinally as shown in Figures 1, 2, 9 and 10, to provide means (later described) cooperating with other elements to operate a toast plate which functions to prevent the toast from falling toward the toasting chamber, after delivery therefrom into the storage chamber. The gear 74 has a crank arm or link 81 attached by one end to it as at 82. This link has the opposite end attached as at 83 to a slidably mounted element 84 which, in turn, is connected at its forward end as at 85 to the lower side 22 of the ejector frame. It will be understood that the gears 73—74 move in unison, and that the links 77—81 act to move the ejector operating element in unison so that the upper and lower ends of the ejector frame are correspondingly moved, thereby always maintaining the frame in upright position, and preventing any binding, which might otherwise interfere with its operation.

The feed frame, including the ratchet bars 50, is moved forwardly and rearwardly by a connection 145 secured at one end as at 146 to the ratchet frame and at the opposite end as at 147 to a crank arm 148 pinned to the shaft 75. It will be noted that the connecting points of the links 77 and 81 with the gears 73—74 and the connecting point of the link 145 with the crank arm 148, are diametrically related to the axis of the winding shaft 75, and that the connecting points 78—82 and 147 lie at opposite sides of the axis.

It is evident that a yieldable connection can also be arranged in the link 145, by introducing a spring stiff enough to move the follower and bread when there is no jamming, but which will yield when the pressure of the compressed bread against the follower exceeds some predetermined figure.

Included as a part of the control mechanism is a main switch 90 of the snap type, shown in closed position in Figures 2 and 3. When this switch is closed the heating coils of the toasting chamber are energized, and the motor circuit is conditioned to be energized by the automatic closure of a snap switch 91 (shown in closed position) which is controlled by mechanism which times the cooking or toasting period. The circuit is diagrammatically indicated in Figure 12. As shown, the main switch 90 controls the energization of all the circuits, and upon closure of this main switch the heating coils are energized, of which these are three; one on the stationary side of the heating chamber, and one on each of the two movable doors which form the opposite side of the heating chamber. A main line wire 92 connects with one side of the switch 90. The opposite side of switch 90 is connected by conductor 93 with contact 94 of switch 91. Contact 94 is connected by conductor 95 to one of the brushes 14, in turn contacting corresponding armature 13 of one of the swinging chamber-forming and heater-supporting elements. Suitable electrical connection is made between the armature and the heating element 11 of that door. Series connections between the other heating elements are indicated at 96, and the terminal heating element of the series is connected to the main line 98. The motor circuit is controlled by switch arm 91 operating against contact 94. The opposite end of the switch arm is connected by conductor 100 to one side of the motor 67 and the opposite side of the motor is connected to the main line by conductor 101. The motor switch 91 is operated by a portion of the timing mechanism, which portion also forms part of the means for holding the clock mechanism against operation, while the spring is being wound.

Timing mechanism per se

Means is provided for automatically timing operation of the device, to produce toast or to properly cook and deliver cooked food and the operation is automatic throughout and is, in this instance, electrically controlled.

The structure of the timing mechanism can best be understood from inspection of Figures 1, 7, 9 and 10. The gear 73 is pinned to the shaft 75, see Figures 1 and 7. Upon this shaft is arranged a sleeve 110, held against rotation by a pin and slot connection which facilitates assembly. One end of the clock spring 111 is attached to this sleeve. Rotatable upon the sleeve is a spring barrel 112 having a gear 113 at its upper end. The opposite end of the spring 111 is connected to this barrel. The gear is in mesh with an end gear 114 of a clock train, the function of which is to regulate the speed of rotation of the spring-driven barrel, to time the toasting period. Any suitable clock mechanism may be employed and therefore no detailed description is given.

The spring barrel 112 is provided in its periphery with a vertical slot 115. A latch plate 116 (see Figure 1) is swingingly pivoted to a block on the cross piece 76 and extends downwardly and is adapted to swing toward and away from the barrel. The plate has a latch finger or projection 117 adapted to enter the slot 115 to prevent rotation of the barrel, while the shaft 75 is rotating, to re-wind the clock spring after each toasting period. The latch plate is yieldably urged toward the barrel. The projection is adapted, when withdrawn from the slot, to impinge the outer surface of the barrel while it is rotating, under the action of a spring. A spring is provided to hold the latch projection in frictional engagement with the barrel surface throughout rotative movement. After a single rotation, the latch again enters the slot. Latch release position is shown in Figure 9, and in this figure, the latch finger 117 is shown riding against the surface of the spring barrel, barrel and finger having been indicated by dotted lines. Latch engaged positions are shown in Figures 1 and 10. The latch is released by means of a pin 120 mounted on the gear 73 which pin engages a projection 121 of a foot plate 122, pivoted as at 123 to the lower end of the latch plate. The bottom surface of this plate moves upon the top surface of the gear, and the plate is guided by pins 124 projecting from the support 76, see Figures 7 and 9. The plate provides arms which lie at opposite sides of the shaft 75. This foot piece has a guide projection 125 which is guided in an opening 126 in the casing. At a point adjacent the foot piece, the element 125 is vertically thickened to extend to a point immediately adjacent the gear 73 to form a stop. A shoulder 127 is thus formed between which and the casing a spring 128 is interposed under compression to normally urge the latch and its trip arm toward the barrel so that the arm may enter the slot. In Figure 9, the latch is shown at the position it occupies after its trip arm has been withdrawn from the slot in the barrel. This withdrawing motion results in stopping the motor, so that the barrel controlled by the clock mechanism can move in performance of its timing function.

Motor over-run-preventing device

It is desirable to substantially prevent over-run of the motor, after de-energization, and thus substantially also prevent over-run of the gear, and it is further desirable to provide means which will substantially prevent further motion of the gear in either direction after motor de-energization and throughout the timing period, during which period all mechanism but the timer should be at rest. To this end, a pin 130 is provided on the gear 73, which pin is so positioned as to engage the stop formed by the vertically thickened portion of the guide element 125 when the latch finger is in its outer position, as shown in Figure 9. This pin does not engage the stop when the latch is at its inner position, as shown in Figures 1 and 10, that is during the winding operation. The spring finger 132, also on the gear 73, acts as a stop to prevent reversing motion. The attached end of this spring clears the shoulder 127, as the gear rotates in counter-clockwise or forward direction, and when the latch finger 117 is in slot 115. The free end of the spring is, however, disposed so that it frictionally engages the shoulder 127 with a wiping action as the gear rotates, and after its end has passed the shoulder, it moves inwardly to stop position. Substantially immediately after the end of this spring has passed the shoulder and lies at the position shown in Figure 9, the pin 120 moves the latch plate in direction to disengage the finger 117, and the stop shoulder of the element 125 correspondingly moves outwardly to the position shown, that is to the opposite side of the rotative path of finger 132 and pin 130, and therefore any tendency to counter-rotation of the gear 73 is checked by the spring 132, while any motion in opposite direction is checked by the pin 130. It will again be noted that after the finger 117 has been withdrawn from the slot, the motor switch is opened so that the shaft 70 can no longer rotate except as the result of mechanical inertia of the motor.

Timer connection with motor switch

As best shown in Figure 10, the latch plate has a projection 140 which enters a depression 141 in the snap switch lever arm 142 and when the latch moves outwardly, this snap switch arm is thrown to open the motor switch. Obviously when the latch is thrown in the opposite direction the motor switch is moved to closed position. Thus the pin 120 acts to move the plate to motor-switch-opening position, immediately following which the barrel begins to rotate under control of the clock mechanism.

Means for rendering machine inoperative after supply exhausted

Means is provided for automatically rendering the entire apparatus inoperative as soon as the supply of bread has been exhausted. Referring to Figures 2 and 3: A trip rod 150 is suitably guided in the frame at a point outside the casing of the magazine and in this instance at a point directly below one of the ratchet bars. This rod moves in direction of feed. A spring 151 is provided which normally holds the rod at the position shown in Figure 2. At each opposite end, the rod has inturned portions forming stops, one indicated at 154 and the other at 155. The stop 154 is adapted to be engaged by the follower after the last piece of toast has been delivered to the storage chamber. The extension 155 at the opposite end of the rod abuttingly engages the main switch operating arm 160 of the main switch 90.

A suitable stop 152 on the rod engages a stop 153 on the frame to limit rod movement, and cause the trip projection 154 to always assume a predetermined position. When these stops are engaged, the finger 154 at the opposite end of the rod is so positioned that after the last piece of bread has been toasted and delivered to the storage chamber, the follower will engage and trip the rod to open the switch, and render the entire apparatus inoperative. The finger 154 is, therefore, in engagement with the switch lever as best shown in Figure 3, when the switch is closed, and on movement of the rod in switch opening direction, the switch is immediately and positively opened.

Referring to Figure 2: The pivoted switch operating lever 160, as a bellcrank lever, has on one arm a finger piece 161 which projects beyond the casing, and on its other arm a hammer 162 which strikes a signal bell 163, as the switch is opened by the trip rod 150. Any suitable signal means may be employed for indicating that this bread supply is exhausted.

Ejector and related mechanism

Means is provided to keep the toast from falling toward the heating chamber after delivery into the storage chamber. To this end there is pivoted as at 174 within the storage chamber to its upper wall 175, as best shown in Figure 1, a plate 176 which normally occupies a fully raised position (not shown) from which it falls by spring action and gravity to the position shown in Figure 2, after the toast has been delivered beneath it, and which is raised against the action of the spring 177. Pivoted to the upper side of this plate, as at 178, adjacent its point of pivotal attachment with the top of the magazine, is a pawl-like element which has a head 179 adapted to pass through either of two openings 180—181, see Figures 9 and 10, of the ejector operating link 80. This pawl has a shank portion 183 which (when the head lies above the link 80) rides in a slot 184, which connects the openings, forming with them a "dumb-bell-shaped" slot. The head 179 will not pass through the slot 184. The head always lies against the under surface of the link 80 during the toasting operation. This head is urged upwardly by a spring 190 mounted on the top of the storage chamber. During the first part of ejector link motion in ejecting direction, the head is forced through opening 180 by the spring 190, raising the plate to permit the toast to pass thereunder. As ejector link motion continues with the head riding on top of the link, the opening 181 passes beneath the head, and the head drops therethrough, and the plate assumes the tensioned toast-holding position of Figure 2. By this means, the plate is first held in such position that the toast can pass beneath it, and after the bottom of the toast is resting upon the fingers 30, in other words has been ejected from the heating chamber, the plate falls and engages the top of the bread as shown in Figure 2, the spring acting to maintain a tensioned condition and prevent falling of the toast in a direction toward the toasting chamber. In other words, the mechanism is such that the toast supporting plate is raised to receive the toast and after the toast is beneath it, it is dropped and yieldably urged against the toast.

A feature relates to the manner of pivotally securing the plate 176. It will be noted (see Figure 9) that slots 200 are provided which extend in direction of feed and that the plate is provided with lugs 201 which extend loosely through the slots, and a pivot bar 174 is passed through these lugs and rests on the top of the casing. A slight play is allowed so that the pivotal axis of the plate can move backwardly and forwardly in direction of feed.

The ejector frame (see Figure 6) is provided with grid-forming wire 205 vertically arranged to prevent the toast falling towards the stationary heating element, and as means to move the toast from the chamber. The door is, or doors are, provided with vertical grid-forming wires 206. The wires 205 act to positively move the toast forwardly, and the forward movement is sufficiently rapid to hold the toast against these wires during the movement toward the storage chamber.

Figure 6 shows the position of the door-opening and toast-ejecting frame, at the end of its ejecting operation, and after the bottom of the toast is resting upon the curved fingers 30. It will be seen that these fingers now lie in the slots 24 or directly there-above. The tips of the spring fingers engage beneath the toast and gradually raise it so that by the time the ejecting frame has reached the position shown in full lines in Figure 6, and in dotted lines in Figure 1, the toast is no longer resting upon the bottom member of the ejector frame, and when the frame moves in an opposite direction the toast will remain upon the bottom of the storage chamber, in a position shown in Figure 2, with the toast plate engaging the endmost piece to prevent it from falling toward the toasting chamber.

It must again be noted that the ejecting movement is sufficiently rapid to hold the toast against the grid during motion toward the storage chamber. In other words, the rapid motion of the grid prevents tipping in one direction, while the toast plate prevents tipping in an opposite direction.

A valuable feature of this invention relates to the arrangement whereby the storage space is at certain times, or may be at all times, in communication with the storage chamber, so that an equalizing of heat takes place which prevents over-heating of the elements during continued operation of the devices, and so that the storage chamber is always maintained at sufficient temperature to keep the toast hot. Additional ventilation to prevent over-heating may be had by forming slots in the side elements as shown, and a certain amount of ventilation takes place through the opening of the side walls through which the doors partly pass when they are in their fully open position, see Figure 6. Of course, it is not absolutely necessary that there be a space between the doors, because heat is delivered to the storage chamber at each opening of the doors. The toast is removed through door 31ª, see Figures 2 and 6.

Operation

Assume the machine parts to have been left in positions corresponding to the position of the ejector in Figure 6, in which ejector and feed rack are at their outer limits. This is the position of the parts after the bread supply is exhausted and after the last piece of toast has been delivered to the storage chamber. The element 117 is in the slot 115, and the spring has been half wound, the motor switch is closed, and the main switch is open. The operator now pulls the follower back, properly places the bread and then closes the main switch. The heating coils and the motor are simultaneously energized. The ratchet frame moves to retracted position, the ejector frame moves to chamber-forming position, the doors 6—7 close, the winding of the clock spring is completed and the machine assumes the position of Figure 1, immediately after which the timer is released due to the disengagement of the latch 117 from the slot 115, by means of pin 120 see Figure 9. A heating period is now timed (barrel 112 is rotating)

while the feed racks and ejector are at rest in the position shown in Figure 1. After one complete rotation of the barrel (end of timed period) the latch 117 again enters the slot closing the motor switch, and causing gears 73—74 to rotate. Bread is fed forwardly and positioned over the toasting chamber and is held while the racks are again fully retracted, after which the bread falls into the chamber due to the action of the trip 35.

The spring winding operation begins and ends, when the parts are positioned substantially as shown in Figure 1. Therefore, this figure may represent either the position of the parts at the beginning of the spring winding operation (motor just closed) or at the end of such operation (motor switch about to be opened). In Figure 9, the pin 120 has just completed the withdrawal of the latch fingers 117, and the motor switch has been opened, and timing period has begun. After this timing period, the finger 117 again enters the slot 115 and winding takes place while the feed racks advance, and while the ejector opens the heating element mounts or doors of the heating chamber, and moves to the position shown in Figure 6, these operations being performed on the first half revolution of the gear 73 from the position shown in Figure 1. On the completion of the other half of the revolution, the ejector moves again to door-closing and chamber-forming position and the feed racks are retracted so that the parts again assume the position shown in Figure 1.

All of the mechanism, with the exception of the timer, can at any time be rendered inoperative by opening the main switch. It is desirable, however, to always open this main switch when the follower 55 is at the forward limit, and after the last piece of bread has been delivered, that is when the feed racks are at the advanced limit and after the last piece of bread has been delivered to the heating chamber. The machine is so designed that the follower actuates the main switch-opening-rod 150 after the last piece of toast has been delivered to the storage chamber. Hence ordinarily the machine will be delivered to the customer with the mechanism thus conditioned. Therefore, when the operator closes the main switch (after having properly placed a supply of bread in the magazine) the heating coils and motor are simultaneously energized because at this time the trip finger 117 is in the slot and the motor switch is closed. On closure of the machine switch, therefore, the feed rack will be withdrawn to its rearward limit to assume the position shown in Figure 1, and by this motion the spring winding operation is completed. Then the latch finger 117 is withdrawn, a timed movement of the barrel takes place, at the end of which the element 117 again enters the slot, closing the motor switch and causing the feed mechanism to move forwardly from the position shown in Figure 1 to push the first piece of toast to the position shown in Figure 5. It will, therefore, be seen that after closure of the motor switch there will be ample time for the cooking chamber to become sufficiently hot before the first piece of toast is delivered thereto. It must be noted that whenever 117 is in the slot, the motor switch is closed, and that, therefore, if the main switch is opened the entire machine is rendered inoperative. When 117 is out of the slot, the motor switch is open, and the opening of the main switch can never interfere with the timing operation because after the barrel is once released, its motion continues for one complete revolution.

If it be assumed that the main switch is closed when the parts are in the position shown in Figure 1, that is if the parts are so positioned that the feed racks move forwardly immediately after the machine begins its operation, then the forward slice should be spaced rearwardly so that the heating elements will have time to reach the desired cooking temperature before toast is delivered to the toasting chamber.

I am aware that there are machines which require the manual introduction of the article to be cooked, and in which the cooking is automatically timed and in which the article is automatically removed but I believe myself the first to produce a machine which is automatic, in that after being once supplied with a large number of articles, such as slices of bread, these slices are automatically fed to the cooking chamber, cooked, and removed from the chamber. While the disclosure herein shows the invention applied for the toasting of bread, it is evident that it would be practicable, by changing dimensions and proportions of the parts, to utilize the principle of the invention for cooking articles of food other than bread and these modifications are considered to be within the scope of my invention, as claimed.

I claim as my invention:

1. In a machine of the class described, the combination of a magazine, a heating compartment, mechanism for feeding articles of food from the magazine to the heating compartment, means for operating said mechanism, intermittently operating mechanism for removing individual articles of food from said heating compartment, means for operating the last mentioned mechanism, and time-controlling means for controlling the intermittent operation of said last mentioned mechanism.

2. In a machine of the class described, the combination of a magazine, a heating compartment, mechanism for intermittently feeding articles of food from the magazine to the heating compartment, means for operating said mechanism, mechanism for intermittently removing articles of food from said heating compartment, means for operating the last mentioned mechanism, and time-controlling means for controlling the intermittent operation of the article feeding and the article removing mechanisms.

3. In a machine of the class described, the combination of a magazine, a heating compartment, mechanism for feeding articles from the magazine to the heating compartment, means for operating said mechanism intermittently, a receiver, and means for transferring the said articles from the heating compartment to the receiver, said means operating intermittently.

4. In a machine of the class described, the combination of a source of supply, a heating compartment, mechanism for transferring an article from the source of supply to the heating compartment, means for operating said mechanism intermittently, mechanism for removing said article from the heating compartment, means for operating the last mentioned mechanism intermittently and means common to said mechanisms for controlling the operation of the same.

5. In a machine of the class described, the combination of a source of supply, a heating compartment, mechanism for transferring an article from the source of supply to the heating compartment, means for operating said mechanism intermittently, mechanism for removing said article from the heating compartment, means for operating the last mentioned mechanism intermittently, and time-controlling means common to said mechanisms for controlling the intermittent operation of the same, and for insuring that each article introduced into the heating compartment remains there a predetermined time.

6. In a machine of the class described, the combination of a magazine, a heating compartment, a follower operating in the magazine, a carrier associated with the heating compartment to remove the contents of the latter, operating mechanism for said follower and said carrier, means for actuating the follower and carrier intermittently to feed an article of food from the magazine to the heating compartment and remove said article of food from the heating compartment respectively, and time-controlling means for controlling the intermittent operation of said actuating means.

7. In a machine of the class described, the combination of a supply compartment, a heating compartment, means for feeding articles of food from the supply compartment to the heating compartment, means for removing the articles of food from the heating compartment, a motor, means operatively connecting the article feeding and removing means to the motor, and a control mechanism for stopping the feeding and removing means while the article of food is in the heating compartment.

8. In a machine of the class described, the combination of a supply compartment, a heating compartment, means for feeding individual articles of food from the supply compartment to the heating compartment, means for removing the article from the heating compartment, a motor, means operatively connecting the article feeding and removing means to the motor, and a time controlling mechanism for stopping the feeding and removing means a predetermined time while the article of food is in the heating compartment.

9. In a machine of the class described, the combination of a supply compartment, a heating compartment, means for feeding individual articles of food from the supply compartment to the heating compartment, positively operating mechanism for removing the article from the heating compartment, a common operating means for the feeding means and removing mechanism, and means for stopping said common operating means during a predetermined time while an article of food is in the heating compartment.

10. In a machine of the class described, the combination of a supply compartment, a heating compartment, positively operating mechanism for feeding articles one by one from the supply compartment to the heating compartment, positively operating mechanism for removing the article from the heating compartment, means for operating said mechanisms, and time means for controlling the operating means for a predetermined time while an article is in the heating compartment.

11. In a machine of the class described, the combination of a supply compartment, a heating compartment, positively operating mechanism for feeding articles one by one from the supply compartment to the heating compartment, positively operating mechanism for removing the articles from the heating compartment, means for operating the feeding and removing mechanisms simultaneously to remove an article from the heating compartment and feed another article thereto, and time means for controlling the operating means for a predetermined time while an article is in the heating compartment.

12. In a machine of the class described, the combination of a supply compartment, a heating compartment, means for feeding articles of food from the supply compartment to the heating compartment, means for removing the articles from the heating compartment, means for simultaneously operating the article feeding and article removing means, and a control mechanism for stopping the feeding and removing means while the article of food is in the heating compartment.

13. In a machine of the class described, the combination of a magazine, a heating compartment, mechanism for intermittently feeding articles of food from the magazine to the heating compartment, mechanism for intermittently removing articles of food from said heating compartment, a motor, means operatively connecting said motor with the article feeding and removing mechanisms, and a time-controlling device controlling the operation of said feeding and removing mechanisms and adapted to stop said mechanisms while the articles are in the heating compartment.

14. In a machine of the class described, the combination of a magazine, a heating compartment, mechanism for intermittently feeding articles of food from the magazine to the heating compartment, mechanism for intermittently removing articles of food from said heating compartment, an electric motor, means operatively connecting said motor with the article feeding and removing mechanisms, a switch in the motor circuit and a time-controlling device operatively connected with said switch and adapted to open the motor circuit while the articles of food are in the heating compartment and close said circuit after a predetermined time to remove said articles and feed articles from the magazine to the heating compartment.

15. In a machine of the class described, the combination of a magazine, a heating compartment, mechanism for feeding articles of food from the magazine to the heating compartment, mechanism for removing articles of food from the heating compartment, an electric motor, means operatively connecting said motor with the article feeding and removing mechanism and a time-controlling device controlling the operation of said motor to stop the same a predetermined time while the articles of food are in the heating compartment and to operate said motor at the expiration of the predetermined time.

16. In a machine of the class described, the combination of a heating compartment, a magazine, means for supplying articles of food from the magazine to said heating compartment, means for removing said articles of food from the heating compartment after being subjected to the heat of the latter, an electric switch to render the heat compartment inoperative, and means for automatically actuating said switch after the last article is removed from said magazine to said heating compartment.

17. In a machine of the class described, the combination of a heating compartment, means for supplying articles of food to said heating compartment, means for removing said articles from the heating compartment, an electric switch to render the heating compartment inoperative, means for automatically actuating said switch when the supply means is inoperative to supply the heating compartment with articles of food, and means for indicating the last mentioned condition of the supply means.

18. In a machine of the class described, the combination of a supply compartment, a heating compartment, a delivery compartment, means for transferring the contents of the supply compartment, to the heating compartment, means for moving articles from the heating compartment to the delivery compartment, a signal to indicate when the supply compartment requires replenishing, and means operable by the mechanism of said supply compartment for actuating said signal.

19. In a machine of the class described, the combination of a supply compartment, a heating compartment, a delivery compartment, means for transferring the contents of the supply compartment to the heating compartment, means for removing articles from the heating compartment to the delivery compartment, an electric switch to render the heating compartment inoperative when the supply compartment requires replenishing, and means associated with the supply compartment for actuating said switch.

20. In a machine of the class described, the combination of a supply compartment, a heating compartment, a delivery compartment, means for transferring the contents of the supply compartment to the heating compartment, means for moving articles from the heating compartment to the delivery compartment, and means to automatically render the heating compartment inoperative when the supply compartment requires replenishing, and to simultaneously indicate the condition of the supply compartment.

21. In a machine of the class described, the combination of a heating compartment comprising a heating unit, means for automatically supplying said heating compartment with an article of food, means for automatically removing said article of food from the heating compartment, means to automatically cut off the heat from the heating compartment when the supply means requires replenishing, and a signal operated by the last mentioned means.

22. In a machine of the class described, the combination of a heating compartment comprising spaced heating units, a magazine, means for automatically moving an article of food from said magazine into said compartment and between said units, means for moving one of the heating units to facilitate the displacement of the article of food from the heating compartment and mechanism for removing said article of food from the heating compartment after movement of said heating unit and through the plane formerly occupied by said heating unit.

23. In a machine of the class described, the combination of a supply compartment, a heating compartment comprising spaced heating units, means for feeding an article of food from the supply compartment to the heating compartment, means for moving one of the heating units out of its normal position to facilitate the displacement of the article of food from the heating compartment, a carrier adapted to support the article of food while in the heating compartment, and means for operating the carrier to cause it to convey the article of food from the heating compartment and through the plane formerly occupied by the movable heating unit.

24. In a machine of the class described, the combination of a heating compartment including a movable heating unit, means normally holding said unit in operative position to subject an article in the heating compartment to the heat of said unit, means for moving said heating unit into an inoperative position, and means for removing an article from the heating compartment through the plane formerly occupied by said heating unit.

25. In a machine of the class described, the combination of a heating compartment including a movable heating unit, mechanism for feeding an article of food to said compartment, a carrier for removing the article of food from the compartment and through the plane normally occupied by said movable heating unit, a motor, means for connecting the motor with the feeding mechanism and carrier, and a time-controlling device for intermittently controlling the operation of said feeding mechanism and carrier.

26. In a machine of the class described, the combination of a normally closed heating compartment having a movable portion, means for moving said portion to open the heating compartment, means for supplying an article of food to the heating compartment, mechanism for automatically removing the article of food from the heating compartment and through the plane normally occupied by said movable portion when in closed position, and means for automatically actuating said mechanism after said portion has moved to open position.

27. In a machine of the class described, the combination of a normally closed heating compartment including a movable heating unit, means for supplying an article of food to the heating compartment, means for moving said heating unit to open the compartment, a carrier for engaging the article of food in the compartment and movable through the plane normally occupied by said movable heating unit when in closed position to remove said contents, and means for actuating said unit and carrier.

ROY J. ANDERSON.